US011040678B2

(12) United States Patent
Aberfeld et al.

(10) Patent No.: US 11,040,678 B2
(45) Date of Patent: Jun. 22, 2021

(54) METHOD FOR CALIBRATING A VEHICLE CONTROL UNIT VIA A VOLTAGE SUPPLY LINE, AND A CORRESPONDINGLY CALIBRATABLE VEHICLE CONTROL UNIT

(71) Applicant: Robert Bosch GmbH, Stuttgart (DE)

(72) Inventors: Andreas Aberfeld, Remseck (DE); Wolfgang Loewl, Affalterbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/481,388

(22) PCT Filed: Jan. 24, 2018

(86) PCT No.: PCT/EP2018/051666
§ 371 (c)(1),
(2) Date: Jul. 26, 2019

(87) PCT Pub. No.: WO2018/141600
PCT Pub. Date: Aug. 9, 2018

(65) Prior Publication Data

US 2019/0389409 A1 Dec. 26, 2019

(30) Foreign Application Priority Data

Feb. 3, 2017 (DE) ......................... 102017201745.7

(51) Int. Cl.
*B60R 16/033* (2006.01)
*H02J 7/02* (2016.01)
*B60W 50/00* (2006.01)

(52) U.S. Cl.
CPC ............ *B60R 16/033* (2013.01); *H02J 7/025* (2013.01); *B60W 2050/0063* (2013.01); *G06F 2212/173* (2013.01)

(58) Field of Classification Search
CPC ........... B60R 16/033; H02J 7/025; H02J 7/02; B60W 2050/0063; B60W 50/00; G06F 2212/173
See application file for complete search history.

(56) References Cited

U.S. PATENT DOCUMENTS

2007/0286225 A1* 12/2007 Enders .............. H04L 12/40032
370/438

FOREIGN PATENT DOCUMENTS

| | | | |
|---|---|---|---|
| DE | 19906095 | A1 | 8/2000 |
| DE | 10301637 | A1 | 7/2004 |
| DE | 102006060114 | A1 | 7/2008 |
| DE | 102014111962 | A1 | 3/2015 |

(Continued)

OTHER PUBLICATIONS

International Search Report for PCT/EP2018/051666, dated May 23, 2018.

*Primary Examiner* — Robert L Deberadinis
(74) *Attorney, Agent, or Firm* — Norton Rose Fulbright US LLP; Gerard Messina

(57) ABSTRACT

A method is described for calibrating a vehicle control unit, a data exchange taking place via a voltage supply line connected to the vehicle control unit, as well as a vehicle control unit, which is configured to carry out a data exchange for calibrating the vehicle control unit via a voltage supply line connected to the vehicle control unit with the aid of a communication signal (powerline communication) modulated to the supply voltage. A corresponding measuring and calibration system is also described.

15 Claims, 1 Drawing Sheet

(56) References Cited

FOREIGN PATENT DOCUMENTS

| | | | |
|---|---|---|---|
| DE | 102015005150 | A1 | 10/2015 |
| JP | 2002173042 | A | 6/2002 |
| JP | 2003101557 | A | 4/2003 |
| JP | 2003318925 | A | 11/2003 |
| JP | 2004350137 | A | 12/2004 |
| JP | 2007022362 | A | 2/2007 |
| JP | 2007043473 | A | 2/2007 |
| JP | 2011058997 | A | 3/2011 |
| JP | 2012212272 | A | 11/2012 |
| JP | 2015058846 | A | 3/2015 |
| WO | 2011039284 | A2 | 4/2011 |
| WO | 2013061507 | A1 | 5/2013 |

* cited by examiner

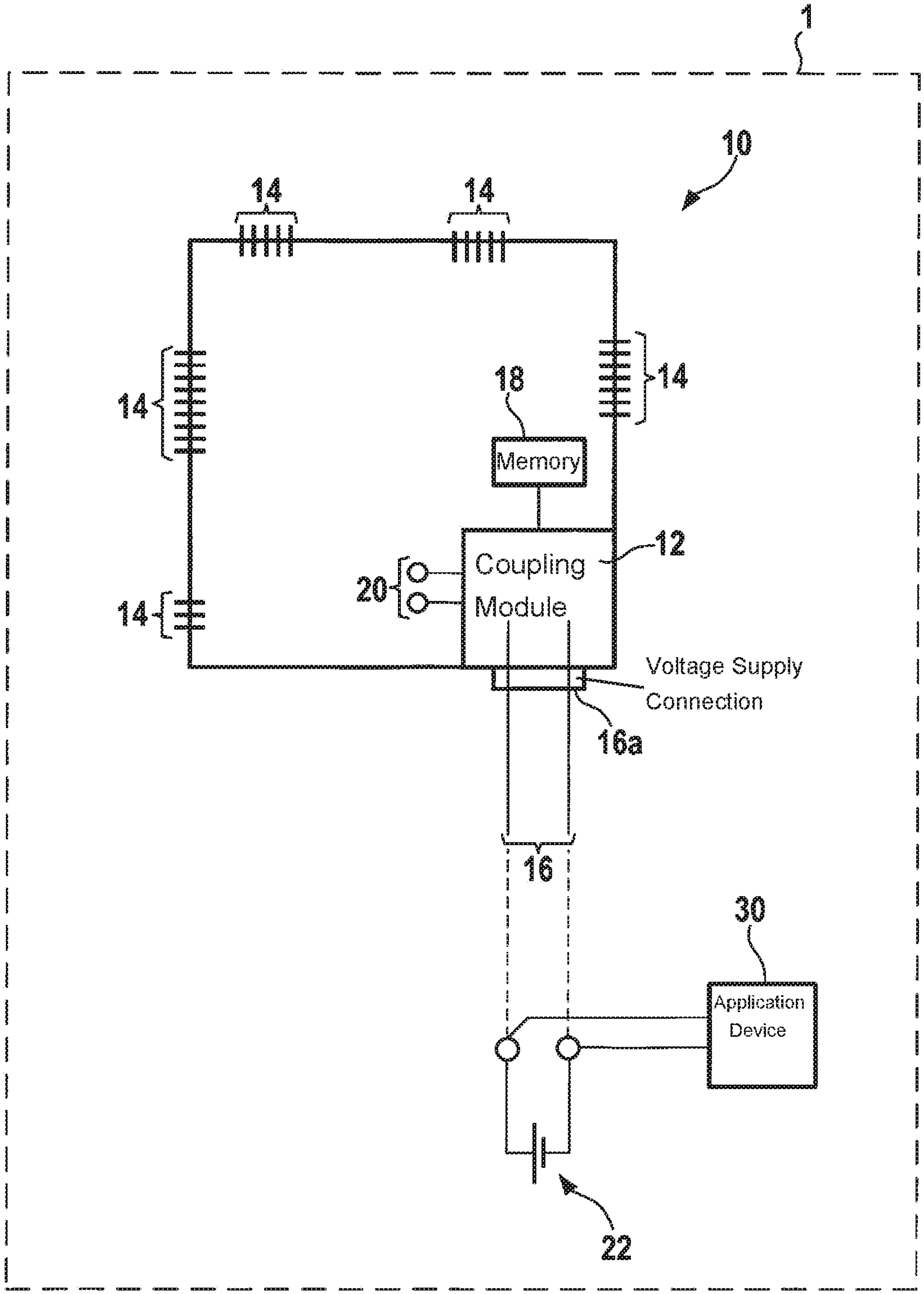
1
10
14
14
14
14
14
18
Memory
Coupling
Module
12
20
Voltage Supply
Connection
16a
16
30
Application
Device
22

METHOD FOR CALIBRATING A VEHICLE CONTROL UNIT VIA A VOLTAGE SUPPLY LINE, AND A CORRESPONDINGLY CALIBRATABLE VEHICLE CONTROL UNIT

FIELD OF THE INVENTION

The present invention relates to a method for calibrating a vehicle control unit, a vehicle control unit and a vehicle that includes such a vehicle control unit, as well as a measuring and calibration system.

BACKGROUND INFORMATION

Modern technical processes, to the extent they are controlled by processing units, so-called control units, may be calibrated to achieve series production readiness (so-called application). In the process, various parameters of the control unit software are adapted to the specific operational purpose, for example, in the vehicle, via extensive measurements and adjustments. Parameters of functional algorithms in particular, (control functions, regulating functions, diagnostic functions) are adapted to different vehicle models or vehicle variants without the need to change calculation routines. At the same time, signals from control units, vehicle busses and measuring devices are detected so that the effects of the adjustment may be checked.

If the parameters in serial devices are not describable, so-called application pattern control units may also be used for the application, which permit a write access to otherwise protected areas.

As suitable interfaces for exchanging data during calibration, it is possible to use reserved interfaces, which are optimized for this purpose and are designed essentially only for this one purpose.

Interfaces may, for example, be provided and optimized, which are used to read measured values and/or to program or calibrate the control unit, i.e. in order to convey or copy the data necessary for the regular operation of the control unit to the control unit, such interfaces often not being provided for further use in series production after successful calibration. Thus, reserved interfaces may be configured to carry out at high speed the tasks assigned to them such as, for example, the calibration of the control unit, and thus to enable a successful calibration of the control unit in a short period of time. Such reserved interfaces must, however, also be removed from the control unit, for example, with the aid of reserved pins in existing plugs or with the aid of a dedicated plug or cable. However, this frequently requires a mechanical retrofitting of the control unit, which may be associated with a significant expenditure of time and effort.

As an alternative to the calibration of a control unit, it is also possible to use a serial interface, i.e., an interface available in series such as, CAN, i.e., an interface which is used during the regular operation of the control unit for receiving and/or transmitting communication signals or data. Such interfaces may be optimized for their regular use, which is why these interfaces are potentially only partially suitable for use in calibrating the control unit and a calibration of the control unit with the aid of such interfaces available in series is potentially very complex and/or slow and/or may be used only for a limited range of functions.

SUMMARY

A method for calibrating a vehicle control unit, a vehicle control unit and a vehicle that includes such a vehicle control unit are provided according to the present invention. A corresponding measuring and calibration system is also the subject matter of the present invention. Advantageous embodiments are the subject matter of the subclaims as well as of the following description.

The present invention employs the measure of carrying out a data exchange for calibrating the vehicle control unit (i.e., control unit in a vehicle) via a voltage supply line connected to the control unit. In other words, the control unit is able to communicate via the voltage supply line with another user connected to the voltage supply line, in particular, with a measuring and calibration system such as, for example, INCA (Integrated Calibration and Application Tool), which includes the hardware adaptation potentially required for this purpose. For example, the control unit includes a coupling module for this purpose, which is configured to receive and to advantageously also transmit a communication signal via a voltage supply line connected to the control unit, the control unit being supplied with electrical power via the voltage supply line.

The calibration includes one or multiple steps, which result in the data required for the regular operation of the control unit reaching the control unit. The calibration includes, in particular, at least one step selected from the group that includes an adjustment of at least one parameter of the control unit software, in particular, of at least one functional algorithm of the control unit software, a programming of the control unit software, i.e., overwriting of program code in a read-only memory of the control unit. This may also include a stimulation, for example, in the case of a rapid prototyping control unit. In the case of control units, "rapid prototyping" or also "(external) bypassing" is understood to mean that control unit software-dedicated function algorithms and control algorithms are replaced from the "outside" without having to change the programmed function code in the control unit. For test purposes, therefore, it is possible to imprint in parts a different behavior on the software function. This may take place, for example, in that software variables in the form of output variables of the one function and, at the same time, input variables of the following function are changed (stimulated) in such a way that the desired behavior occurs.

In addition, the data exchange may advantageously also be used to transmit signals originating from the vehicle to other users, in particular, signals from control units or from vehicle busses. Thus, the control unit may be connected to a measuring and calibration system only via the voltage supply line.

The present invention in this case offers the advantage that both a supply voltage may be applied and a communication signal may be received via the voltage supply line. This is advantageous, in particular, because it is not necessary to design two separate interfaces for receiving the communication signal and the supply voltage, but that for this purpose a connection preferably already designed in or on the control unit for connection with the voltage supply line may also be used for receiving the communication signal. This may reduce the manufacturing effort and the manufacturing costs of the control unit. The control unit may be manufactured, in particular, as a compact unit since, according to the present invention, the control unit does not necessarily have to include for calibration a reserved interface for receiving the communication signal. In this case, the present invention preferably employs established methods of carrier-frequency technology as used, in particular, in carrier-frequency systems (TFA), for example, the so-called powerline technology (also known as PowerLAN or Powerline Communication (PLC)) for home applications. Although not suited for standard applications in the vehicle for lack of corresponding transmission reliability and due to special requirements in the automotive sector such as, for example, environmental requirements (temperature, vibration, EMV . . . ) as well as size in the control unit and costs for the large-scale production, it was nevertheless found in conjunction with the present invention that a calibration process may be advantageously carried out using these technologies, since this calibration process does not impose such requirements.

The present invention also offers the advantage that no mechanical retrofitting of the control unit is required for removing a reserved interface for receiving the communication signal, such as, for example, manufacturing a housing opening for a cable feed-through or reserving control unit plug pins, thereby significantly reducing the expenditure of effort in constructing the control unit for calibration.

The present invention also offers the advantage that the access to the control unit need not be limited to one particular location within the vehicle, such as, for example, to the engine compartment, but is, in principle, possible wherever the on-board voltage of the vehicle is present or may be tapped or is accessible. This may be the case, for example, in a luggage compartment and/or in a passenger compartment of the vehicle. Thus, the control unit may preferably be placed at virtually any position in the vehicle, since only one access to the automotive electrical system voltage is sufficient for the data exchange. Accordingly, a connection suitable for transmitting or feeding or modulating the communication signal may be designed at virtually any location in the motor vehicle. A measuring and calibration system may, for example, be equipped with a corresponding coupling module, which enables a transmission and/or feeding and/or modulation of the communication signal to the supply voltage or automotive electrical system voltage.

During the data exchange, the control unit is advantageously supplied with power, in particular, by a vehicle battery and/or by a vehicle generator as the power source, via the voltage supply line connected to the control unit. Thus, the control unit may remain in the vehicle, in particular, during communication.

The supply voltage is preferably modulated using the communication signal. This means that the communication signal is imprinted on the supply voltage. The relative amplitude of the supply voltage may, for example, be modulated in accordance with the communication signal, i.e., that the control unit may be provided with the communication signal based on a chronological change of the amplitude of the supply voltage. Such an amplitude modulation may, for example, have an amplitude, which is preferably not greater than 20%, more preferably not greater than 10%, even more preferably not greater than 5%, much more preferably not greater than 2%, particularly preferably not greater than 1% of the amplitude of the supply voltage. The communications signal may be modulated to the supply voltage, in particular, in such a way that the absolute amplitude modulation is not greater than 1 V, preferably not greater than 0.5 V, more preferably not greater than 0.25 V, even more preferably not greater than 0.1 V, much more preferably not greater than 50 mV, most preferably not greater than 10 mV. Such an amplitude modulation may be advantageous, in particular, when the supply voltage is provided in the form of a direct voltage, as is often the case in on-board power supplies of motor vehicles.

The modulation of the supply voltage using the communication signal may also take place with the aid of a frequency modulation, in particular, in a case in which the supply voltage is provided in the form of an alternating voltage.

Regardless of the exact type of modulation, the coupling module is preferably configured to demodulate the communication signal from, or modulate the communication signal to, the supply voltage. In this way, the coupling module may extract the communication signal from the supply voltage and provide it to the control unit, so that the control unit may process the communication signal, preferably without the control unit having to perform additional transformations or modifications to the communication signal.

Additional advantages and embodiments of the present invention result from the description and from the appended drawing.

The present invention is schematically represented in the drawing based on an exemplary embodiment and is described below with reference to the drawing.

BRIEF DESCRIPTION OF THE DRAWINGS

FIG. 1 shows a schematic representation of a vehicle control unit according to one specific embodiment.

DETAILED DESCRIPTION

FIG. 1 shows a schematic representation of a vehicle control unit 10 according to one preferred specific embodiment in a vehicle 1, for example, a motor vehicle. Vehicle control unit 10 (hereinafter: control unit) may be designed, for example, as an engine control unit for controlling an internal combustion engine, a clutch control unit for controlling a clutch, a battery control unit for controlling a vehicle battery, an E-control unit for controlling an electric machine, etc.

The control unit in the specific embodiment shown includes a coupling module 12, which is integrated into control unit 10 and, in this way, forms a structural unit with control unit 10. According to another specific embodiment, the coupling module may also be situated outside control unit 10, which may be advantageous, for example, for small control units with small available space. In addition, control unit 10 also includes multiple serial interfaces 14, which are used to receive and/or to transmit signals during the regular operation of control unit 10. Serial interfaces 14 may include, in particular, CAN-, FlexRay-, LIN-, etc., interfaces. Furthermore, additional interfaces not shown may be provided for additional connection signals.

Control unit 10 is supplied with electrical voltage via voltage supply line 16 from a vehicle on-board power supply that includes a vehicle battery 22, control unit 10 in the example shown being connected via coupling module 12 to voltage supply line 16. Control unit 10 or coupling module 12 is preferably connected to voltage supply lines 16 via a voltage supply connection 16*a* of control unit 10.

During a data exchange with control unit 10 for a calibration process, i.e., when the control unit is calibrated or programmed by uploading data into an internal data memory 18 of control unit 10, and/or during maintenance tasks, in which data stored in internal data memory 18 must be accessed, control unit 10 or coupling module 12 is supplied with a communication signal via voltage supply lines 16. The communication signal is preferably modulated to the supply voltage, which is provided with the aid of voltage supply line 16.

Coupling module 12 is configured to demodulate the incoming signal, which includes the supply voltage and the modulated communication signal, so that the communication signal is provided to control unit 10 independently of the supply voltage and, for example, may be written into internal data memory 18 and/or prompts control unit 10 to carry out computing operations and/or to configure itself.

Coupling module 12 may further include internal voltage supply connections 20, to which the coupling module at least partially loops through the supply voltage received via voltage supply lines 16, or via which coupling module 12 provides the supply voltage to control unit 10 or to other internal components of control unit 10. In the process, the communication signal may essentially still be modulated to the voltage provided at voltage supply connections 20. Alternatively, the modulated communication signal may have been removed or filtered out by coupling module 12 at voltage supply connections 20.

In an alternative embodiment, the coupling module may also be inductively or capacitively coupled to the voltage supply lines, which are connected to control unit 10.

Vehicle 1 may, in particular, include an access (connection) to the vehicle on-board power supply, thus enabling a communication between control unit 10 and an application device 30, such as a measuring and calibration system. According to one preferred specific embodiment (not shown), application device 30 also includes a corresponding coupling module. A motor vehicle may, for example, include corresponding connections in the passenger compartment and/or in the luggage compartment, with the aid of which a feeding in and reading out of the communication signal is enabled, without the engine compartment of the motor vehicle with control unit 10 placed therein having to be accessible in the process. A vehicle power outlet is preferably sufficient for such purpose.

What is claimed is:

1. A method for calibrating a vehicle control unit, comprising:

performing a data exchange that takes place via a voltage supply line connected to the vehicle control unit, wherein the vehicle control unit is calibrated by uploading data received from the voltage supply line into an internal data memory of the vehicle control unit.

2. The method as recited in claim 1, further comprising:

supplying the control unit with power during the data exchange via the voltage supply line connected to the control unit.

3. The method as recited in claim 2, wherein the control unit is supplied with power during the data exchange by a vehicle power source.

4. The method as recited in claim 1, wherein the data exchange takes place using an application device connected to a vehicle on-board power supply.

5. The method as recited in claim 1, wherein the data exchange takes place with the aid of a communication signal modulated to a supply voltage.

6. A vehicle control unit, comprising:

an arrangement to carry out a data exchange for calibrating the vehicle control unit via a voltage supply line connected to the vehicle control unit, wherein the vehicle control unit is calibrated by uploading data received from the voltage supply line into an internal data memory of the vehicle control unit.

7. The vehicle control unit as recited in claim 6, further comprising:

a coupling module for receiving a communication signal via the voltage supply line.

8. The vehicle control unit as recited in claim 7, wherein at least one of:

the coupling module is integrated into the vehicle control unit, and the coupling module is situated on the vehicle control unit.

9. The vehicle control unit as recited in claim 7, wherein the coupling module is configured to modulate the communication signal to, and to demodulate the communication signal from, a supply voltage.

10. A vehicle, comprising:

a vehicle control unit that includes an arrangement to carry out a data exchange for calibrating the vehicle control unit via a voltage supply line connected to the vehicle control unit, wherein the vehicle control unit is calibrated by uploading data received from the voltage supply line into an internal data memory of the vehicle control unit.

11. The vehicle as recited in claim 10, wherein a supply voltage for the vehicle control unit is provided as an automotive electrical system voltage of a motor vehicle.

12. The vehicle as recited in claim 11, wherein a communication signal received via the voltage supply line is modulated to the automotive electrical system voltage.

13. A measuring and calibration system, comprising:

an arrangement for carrying out a data exchange for calibrating a vehicle control unit via a voltage supply line connected to the vehicle control unit, wherein the vehicle control unit is calibrated by uploading data received from the voltage supply line into an internal data memory of the vehicle control unit.

14. The measuring and calibration system as recited in claim 13, further comprising a coupling module that transmits a communication signal via the voltage supply line.

15. The measuring and calibration system as recited in claim 14, wherein the coupling module modulates the communication signal to, and demodulates the communication from, a supply voltage.

* * * * *